US010688986B2

(12) United States Patent
Shimizu et al.

(10) Patent No.: US 10,688,986 B2
(45) Date of Patent: Jun. 23, 2020

(54) AUTOMATIC PARKING CONTROL DEVICE

(71) Applicant: Mitsubishi Electric Corporation, Tokyo (JP)

(72) Inventors: Hirokazu Shimizu, Tokyo (JP); Nariaki Takehara, Tokyo (JP)

(73) Assignee: Mitsubishi Electric Corporation, Chiyoda-ku, Tokyo (JP)

( * ) Notice: Subject to any disclaimer, the term of this patent is extended or adjusted under 35 U.S.C. 154(b) by 472 days.

(21) Appl. No.: 15/041,567

(22) Filed: Feb. 11, 2016

(65) Prior Publication Data

US 2016/0375897 A1    Dec. 29, 2016

(30) Foreign Application Priority Data

Jun. 23, 2015    (JP) ................................ 2015-125377

(51) Int. Cl.
| | |
|---|---|
| *B60W 30/06* | (2006.01) |
| *B60W 10/18* | (2012.01) |
| *B60W 10/10* | (2012.01) |
| *B60W 10/06* | (2006.01) |
| *B60R 1/00* | (2006.01) |

(52) U.S. Cl.
CPC ............ *B60W 30/06* (2013.01); *B60R 1/00* (2013.01); *B60W 10/06* (2013.01); *B60W 10/10* (2013.01); *B60W 10/18* (2013.01); *B60R 2300/806* (2013.01)

(58) Field of Classification Search
None
See application file for complete search history.

(56) References Cited

U.S. PATENT DOCUMENTS

| | | | | |
|---|---|---|---|---|
| 2003/0150661 A1* | 8/2003 | Kataoka | ................. | B60Q 9/004 180/204 |
| 2013/0131939 A1* | 5/2013 | Lee | ........................ | B60W 10/06 701/53 |
| 2014/0200769 A1* | 7/2014 | Noh | ....................... | B60W 30/06 701/41 |

(Continued)

FOREIGN PATENT DOCUMENTS

| | | |
|---|---|---|
| JP | 10-269497 A | 10/1998 |
| JP | 11-348608 A | 12/1999 |
| JP | 2004-169588 A | 6/2004 |

(Continued)

OTHER PUBLICATIONS

Communication dated Apr. 5, 2016 from Japanese Patent Office in counterpart Application No. 2015-125377.

*Primary Examiner* — Christian Chace
*Assistant Examiner* — Kyung J Kim
(74) *Attorney, Agent, or Firm* — Sughrue Mion, PLLC; Richard C. Turner

(57) ABSTRACT

An automatic parking control device enables operations after the completion of parking to be made based on a users' general behavior required at the time of parking of a vehicle. This automatic parking control device is provided with a processing unit, which calculates a parking guide path of the host vehicle from an image of a camera and an output signal of a distance measuring sensor and performs a drive system stop mode as preliminarily set with respect to the vehicle depending on the parking mode given when it is found that the vehicle has been parked in a parking space along the guide path.

23 Claims, 2 Drawing Sheets

(56) References Cited

U.S. PATENT DOCUMENTS

2015/0367846 A1* 12/2015 Sans .................. B62D 15/027
                                                                                               701/23

FOREIGN PATENT DOCUMENTS

| JP | 2007-161119 A | 6/2007 |
| JP | 2007-219738 A | 8/2007 |
| JP | 2011-30140 A | 2/2011 |
| JP | 2011-54116 A | 3/2011 |
| JP | 2014-105661 A | 6/2014 |
| JP | 2015-81022 A | 4/2015 |

* cited by examiner

AUTOMATIC PARKING CONTROL DEVICE

BACKGROUND OF THE INVENTION

1. Field of the Invention

The present invention relates to an automatic parking control device for carrying out automatic parking assist and fully automatic parking by using a surround view camera and a surround obstacle-distance sensor.

2. Description of the Related Art

For the purpose of keeping a driver from feeling unease in a case where collision with an obstacle is expected during automatic parking control, so that his/her vehicle or car (hereinafter represented by "vehicle") has to be stopped, a conventional automatic parking control device such as described in Japanese Patent Application Laid-open No. 2015-81022, performs steering control and speed control so that the vehicle may move along a target route toward a recognized parking space. When the vehicle is detected approaching an obstacle while the vehicle is moving toward the parking space, a collision position where the vehicle will collide with the obstacle is calculated. Based on a buffer distance which is set depending on whether the vehicle advances or backs up and the collision position calculated as above, a stop position on the target route is calculated, and speed control is performed so that the vehicle may stop at the calculated stop position.

Such a conventional automatic parking control device as above is only for the purpose of moving the user's or driver's vehicle to a parking space which is a specific target, but is not a technique for predicting the user's actions or behavior after the purpose has been achieved by moving the car.

Since the normal act of stopping a vehicle in a parking space per se, is aimed at either actions prior to the user getting out and leaving the vehicle or only stopping the vehicle temporarily in that space, succeeding actions by the user such as turning the ignition OFF become necessary.

Also, as the main means for informing the user of the fact that the automatic parking operation has been completed, there are cited a "completion alarms", or an "indicator displays" such as in the instrumental panel indicating the completion, or the like.

However, there have been cases where such means may not allow operations after those automatic parking operations or automatic parking assist operations have ended to be surely executed or may allow those operations to be forgotten in a busy driving environment, etc.

SUMMARY OF THE INVENTION

The present invention has been made taking account such problems as noted above and has an object of providing an automatic parking control device which enables operations after the completion of parking to be surely executed, based on a user's general action required when the vehicle is parked.

For achieving the above object, an automatic parking control device according to the present invention comprises: a camera; a distance measuring sensor; and a processing unit which calculates a parking guide path of a host vehicle from an image of the camera and an output signal of the sensor and performs a drive system stop mode as preliminarily set with respect to the vehicle depending on a parking mode given when it is found that the vehicle has been parked in a parking space along the guide path.

Since the automatic parking control device according to the present invention is arranged to execute the drive system stop mode preset for the vehicle depending on a given parking mode when it is determined that the vehicle has been completely parked in the parking space along the parking guide path, the operations expected by the driver after the completion of parking are surely made at the time of fully automatic parking or parking assist.

Therefore, with the preparation for the driver's next action accompanied, smoother drive operations become possible, leading to actions free from unease for the driver's operations, and reducing action stresses.

DETAILED DESCRIPTION OF THE PREFERRED EMBODIMENT

Figure 1:
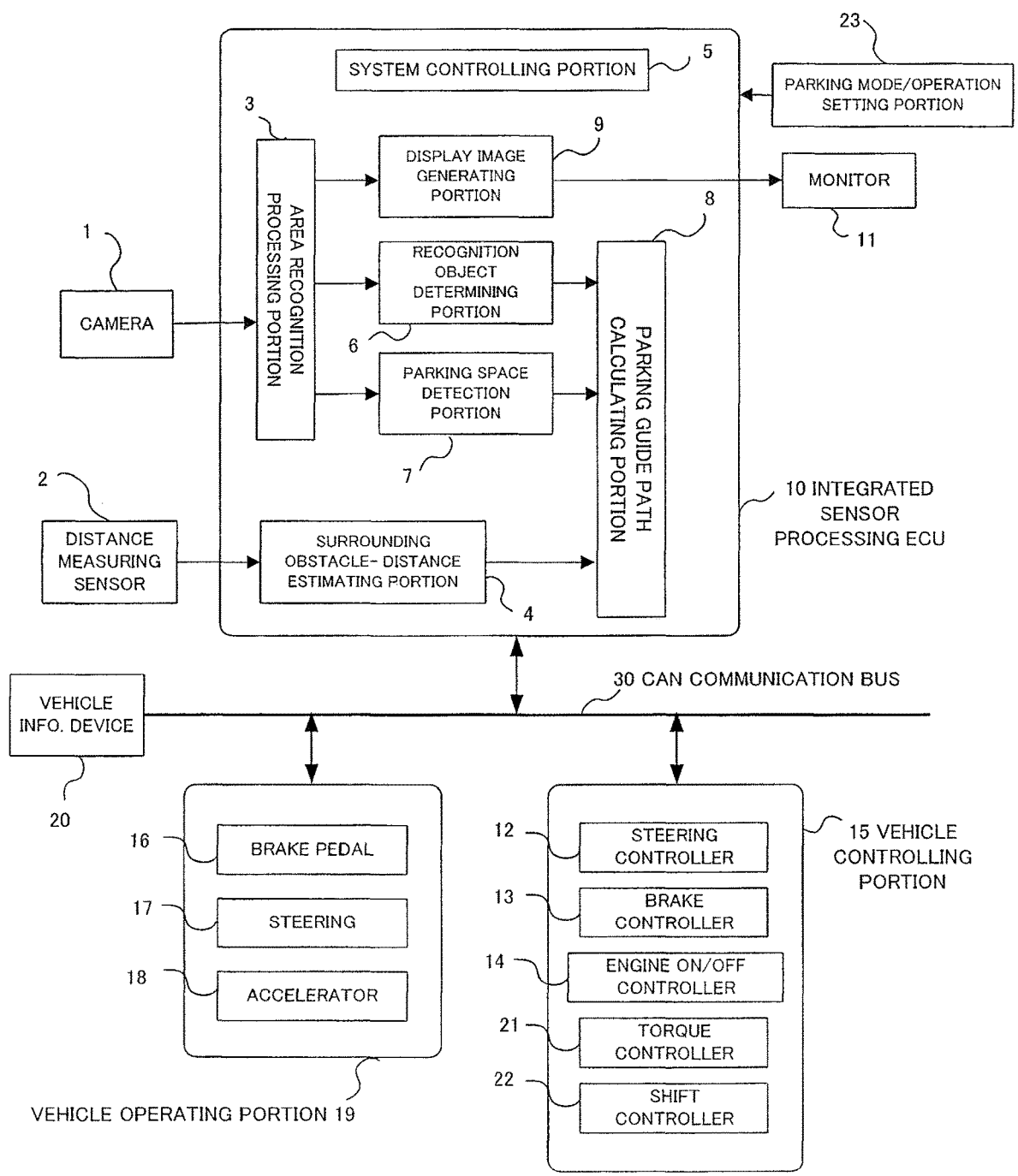
FIG. 1 is a block diagram showing an arrangement of an automatic parking control device common to each embodiment of the present invention.

Hereafter, each embodiment of an automatic parking control device according to the present invention will be described referring to the drawings attached.

Embodiment 1

In an automatic parking control device according to the present invention shown in FIG. 1, on one input side of an integrated sensor processing ECU (Engine Control Unit) 10 designed for collectively processing the outputs of surrounding sensors, a camera 1 equipped to grasp the surrounding status and a distance measuring sensor 2 mainly for measuring the distance to an obstacle are connected. Also, on the other input side of the integrated sensor processing ECU 10, a parking mode/operation setting portion 23 is connected. On the output side of the integrated sensor processing ECU 10, a monitor 11 is connected.

The integrated sensor processing ECU 10 includes an area recognition processing portion 3, a surrounding obstacle-distance estimation portion 4, a system controlling portion 5, a recognition object determining portion 6, a parking space detecting portion 7, a parking guide path calculating portion 8, and a display image generating portion 9.

The integrated sensor processing ECU 10 is also connected to a vehicle controlling portion 15, a vehicle operating portion 19, and a vehicle information device 20 via a CAN (Controller Area Network) communication bus 30. The vehicle controlling portion 15 includes a steering controller 12, a brake controller 13, an engine ON/OFF controller 14, a torque controller 21, and a shift controller 22. The vehicle operating portion 19 includes a brake pedal 16, a steering 17, and an accelerator 18.

In operation, image information taken by the surround view camera 1 is input to the area recognition processing portion 3, and the area recognition result is given to the recognition object determining portion 6, the parking space detecting portion 7, and the display image generating portion 9. The recognition object determining portion 6 carries out the recognition processing of people, vehicles, and the like. The parking space detecting portion 7 detects the border of a parking space. The display image generating portion 9 provides a display image to the monitor 11.

A signal, showing the distance to an obstacle, from the distance measuring sensor 2 is sent to the surrounding obstacle-distance estimating portion 4. The distance measuring sensor 2 is assumed to be an active sensor, in which supersonic wave sensors, millimeter wave sensors, or the like may be mentioned as a typical sensor. The surrounding obstacle-distance estimating portion 4 calculates a distance to another vehicle or obstacle surrounding the vehicle based on the present position information of the host vehicle from the vehicle information device 20, and sends the result to the parking guide path calculating portion 8.

The parking guide path calculating portion 8 receives as inputs, the recognition processing result for characters, vehicles, or the like from the recognition object determining portion 6, the parking space frame detected by the parking space detecting portion 7, and the calculation result of the distance to another vehicle or obstacle surrounding its own vehicle from the surrounding obstacle-distance estimating portion 4. Based on these inputs, the parking guide path calculating portion 8 predicts the danger of collision in the travelling direction of the vehicle and determines whether or not there is a parking space for the vehicle. When there is a parking space, the parking guide path calculating portion 8 seeks control parameters necessary for guiding the vehicle to the parking guide path, exchanges information with the vehicle operation portion 19 and the vehicle controlling portion 15 that is an actuator via the CAN communication bus 30 from the system controlling portion 5 making communications with the outside of the integrated sensor processing ECU 10, and provides the necessary control amounts to the steering controller 12 and the brake controller 13.

Here, where the complete automatic parking mode is set from the parking mode/operation setting portion 23, the parking guide path calculating portion 8 guides the vehicle to the targeted parking position while continuously ascertaining the distance relationship to an obstacle with the camera 1 and the distance measuring sensor 2 as a surround sensor. At this time, via the system controlling portion 5, the parking guide path calculating portion 8 executes the steering control via the steering controller 12 within the vehicle controlling portion 15, the brake control via the brake controller 13, the control of the engine or motor necessary for moving via the torque controller 21, and the forward/backward control of the vehicle via the shift controller 22. It is to be noted that in the fully automatic parking mode, a driver need not always be aboard the vehicle.

When the guiding of the host vehicle to the targeted parking space is completed, the parking guide path calculating portion 8 notifies the completion of the vehicle parking to the vehicle controlling portion 15, and turns the ignition of the vehicle OFF through the engine ON/OFF controller 14. This fully automatic parking mode makes the shift controller 22 shift to the parking mode concurrently with the engine being turned OFF and operates the parking brake to bring the host vehicle to a stable fixed parking. In a case where the vehicle is one driven by a motor, not driven by an engine represented by an internal combustion engine, a motor control power source (not shown) etc., not the engine, as a drive system is turned OFF. Further, for the shift mode or parking bake mode, some means may also be applied to urge the driver to execute same.

Next, the operating procedure of the automatic parking controlling device according to the present invention shown in FIG. 1 will be described referring to the flow chart of FIG. 2.

First of all, when the starting of the automatic parking is requested through the user's (driver's) operation from e.g. the parking mode/operation setting portion 23, the automatic parking routine is started, so that search step S100 for the surrounding parking space is executed by the recognition object determining portion 6 and the parking space detecting portion 7 shown in FIG. 1. Simultaneously, a surrounding obstacle detection step S101 is executed by the surrounding obstacle-distance estimating portion 4. These "Search step S100 for surrounding parking space" and "Surrounding obstacle detection step S101" have mutually different weights on two kinds of sensor information from the camera 1 and the sensor 2, depending on the parking mode. Particularly, in the case of "parallel parking" or where there is another vehicle around the target parking space, the surrounding obstacle detection step S101 executed based on the position information from the surrounding obstacle-distance estimating portion 4 becomes important.

When it is determined at step S102 that the host vehicle can be sufficiently parked in the target parking space (YES at step S102), the parking guide path calculating portion 8 executes a guide path calculating step S103 for guiding the host vehicle to the parking space found at search step S100 for the surrounding parking space by the parking space detecting portion 7.

When it is determined at step S102 that the host vehicle cannot be parked in the target parking space due to a status change for some reason (NO at step S102), the automatic parking is ended at automatic parking operation mode end step S104, and determination of the next operation is entrusted to the user (driver).

By executing the guide path calculating step S103, the guide path for guiding the host vehicle to the target parking space is calculated. Then, a guide control step S105 for guiding the host vehicle to the target parking space is executed. When guiding the vehicle to the target parking space is completed (YES at step S106) by executing the guide control step S105, it is determined at step S107 whether or not "Parking mode" by the parking mode/operation setting portion 23 is set to the fully automatic parking mode.

As a result, when the fully automatic parking mode is set (YES at step S107), a drive system stop mode step S109 is executed. This "Drive system stop mode step" serves to set the parking brake ON at step S109*b* by e.g. turning the ignition OFF at step S109*a* and setting the shift mode to the Park (P).

Here, the fully automatic parking mode determined at step S107 supposes, only for the purpose of parking the vehicle in the parking space at the time when the driver starts the surrounding parking space search at step S100 through the parking mode/operation setting portion 23, both a case where the mode is selected when the driver is already away from the vehicle and a case where the driver has selected the mode to automatically park the vehicle while driving.

Moreover, by the act of turning the ignition OFF at step S109*a*, the engine is stopped in a vehicle primarily driven by an internal combustion engine. This means that in a primarily motor-driven vehicle a control circuit or an energy supply circuit, etc. for driving the motor is cut. Thus, step S109*a* primarily cuts the drive source for driving the vehicle, while step S109*b* executes the operation for more stably fixing the vehicle, that is the operation of shifting the shift lever to the parking position or the operation of turning the parking mode ON.

Embodiment 2

An automatic parking control device according to Embodiment 2 of the present invention can use the arrangement of FIG. 1 in the same manner as Embodiment 1 described above. However, it is assumed that a driver is aboard the vehicle in order to adopt a "Parking assist" mode.

Therefore, it becomes possible to use the brake pedal 16 in the vehicle operating portion 19, to appropriately adjust the speed when the vehicle is moving back and forth, and to stop the vehicle when the driver has determined it is dangerous. Also, there are cases where the parking space may have a slope or a bump to overcome, so in such cases as well variable torque control with the accelerator 18 becomes possible.

After the vehicle is moved to the target parking space and the driver is informed by the parking guide path calculating portion 8 that the vehicle has been moved to the parking position as targeted (YES at step S106), when the driver presses the brake pedal 16 after receiving the stop assist selection by the parking mode/operation setting portion 23, the engine ON/OFF controller 14 turns the ignition of the vehicle OFF.

In this case, however, if the driver simply presses the brake pedal as under normal use, there is a fear that the ignition will be turned OFF, an unintended operation of the driver. Therefore, at step S107 when the parking mode/operation setting portion 23 sets the parking assist mode, not the fully automatic parking mode, and at step S108 with light braking operations repeated twice or more for a short time (YES at step S108), the driver can accurately inform the vehicle of either a simple braking operation or stop assist mode.

When the end of the parking assist mode is explicitly indicated (YES at step S108), the routine proceeds to the parking system stop mode step S109. Concurrently with the ignition being turned OFF at step S109a, the shift lever is shifted to the parking mode by the shift controller 22, thereby achieving the parking brake operation (step S109b) and the host vehicle is safely and fixedly parked.

Figure 2:
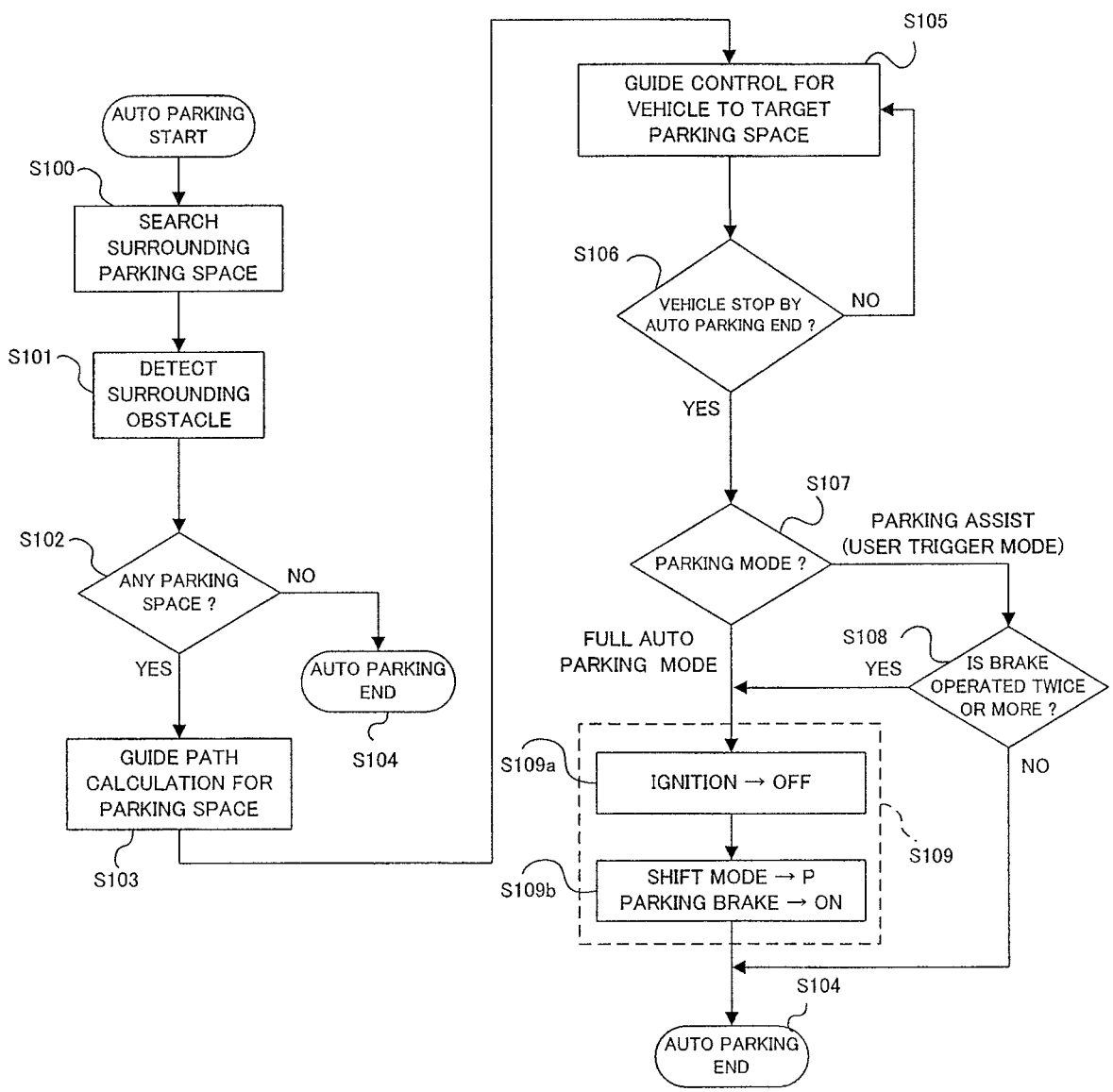
FIG. 2 is a flow chart showing the operation procedure according to Embodiments 1 and 2 of the present invention.

Thus, the processing flow of this Embodiment 2 is partially modified different from the processing flow of FIG. 2 as described for Embodiment 1, so that "Parking assist mode (user trigger mode)" is presented as a result of the parking mode determination at step S107. This processing flow assumes the parking assist operation taking place where the driver is aboard the host vehicle.

Then, at step S108 where some driver initiative is reflected when guiding the vehicle to the parking space, there is an indication that the vehicle has already moved to the target parking space, where it is determined whether the braking operation is done twice or more consecutively. Here, the braking operation being done twice or more generally indicates a pumping brake operation. Also, it is needless to say that while the repetition time has been mentioned in the above as being twice or more, it can be arbitrarily set by a vehicle setting or user setting.

When a plurality of consecutive braking controls are thus performed by the driver's operation and an intentional processing for the drive system stop mode step S109 is performed, the driving source for moving the vehicle is cut at step S109a, and the operation for stably fixing the vehicle, that is the operation for shifting the shift lever to the parking position or for turning the parking mode ON is made at step S109b.

If it is expressly found at step S108 that a plurality of consecutive braking controls are not performed, so that the engine is not turned OFF by the driver, the driving system is left as it is with no operation carried out, thereby ending the automatic parking assist operation itself.

As mentioned above, the present invention performs the steering control and the speed control so that the vehicle may be moved toward the recognized parking space based on the parking guide path calculation result calculated inside the car. And, collision avoidance is carried out with cameras and distance sensors equipped in the periphery of the vehicle so that the vehicle may not contact with an obstacle. The vehicle then moves to the targeted parking space, whereby the parking is completed.

After the parking is completed, the ignition is automatically turned OFF, thereby informing the driver of the fact that the parking operation has ended. This enables the driver to recognize that he/she can leave the vehicle and to smoothly shift to the operation for opening/closing the vehicle door.

Moreover, if there is some intervening driver operation during the parking operation as a parking assist, not as fully automatic parking, the completion of the parking assist does not always mean that the driver's line of sight faces the front display portion during the driving operation, but that at the time of parking, particular attention is focused on the surroundings, so that it may be slightly difficult to determine whether or not the parking assist operation of the vehicle has been completed.

On the other hand, if the driver uses the parking assist device, the driver can perform the braking operation in the parking space under the driver's will, so that the driver can determine that the parking of his/her own vehicle has been completed. Therefore, it is possible to automatically turn the ignition OFF based on the driver's vehicle operation information. Accordingly, by notifying the user of the completion of the parking assist, the driver can smoothly shift to the next action such as leaving the vehicle.

What is claimed is:

1. An automatic parking control device comprising:
    a camera;
    a distance measuring sensor; and
    a mode setting component for setting one of at least two different parking modes comprising a fully automatic parking mode and a parking assist mode;
    a processor which calculates a parking guide path of a host vehicle from an image of the camera and an output signal of the sensor and performs a drive system stop mode as preliminarily set with respect to the vehicle depending on the set parking mode, when it is found that the vehicle has been parked in a parking space along the guide path.

2. The automatic parking control device according to claim 1 wherein,
    the processor detects the parking space from the image of the camera, estimates a distance between the vehicle and any surrounding obstacles from the output signal of the sensor, determines a presence or absence of the parking space with respect to a travelling direction of the vehicle, calculates a parking guide path from the distance between the vehicle and the surrounding obstacles, and executes the drive system stop mode when it is determined that the vehicle has been parked in the parking space along the parking guide path.

3. The automatic parking control device according to claim 2 wherein,
    the drive system stop mode operates to turn the ignition OFF.

4. The automatic parking control device according to claim 3 wherein, the drive system stop mode operates to turn the ignition OFF as well as to shift a shift mode to parking, and to set a parking brake ON.

5. The automatic parking control device according to claim 1 wherein,
the processor stops a drive system of the vehicle without further driver input as the drive system stop mode when the parking mode is set to the fully automatic parking mode.

6. The automatic parking control device according to claim 5 wherein,
the drive system stop mode operates to turn the ignition OFF.

7. The automatic parking control device according to claim 6 wherein,
the drive system stop mode operates to turn the ignition OFF as well as to shift a shift mode to parking, and to set a parking brake ON.

8. The automatic parking control device according to claim 5 wherein,
the drive system comprises an engine.

9. The automatic parking control device according to claim 5 wherein,
the drive system comprises a motor.

10. The automatic parking control device according to claim 1 wherein,
the processor stops a drive system of the vehicle in response to a driver performing a braking operation set as the drive system stop mode when the parking mode is set to the parking assist mode where the driver is aboard the vehicle.

11. The automatic parking control device according to claim 10 wherein,
the braking operation consists of two or more consecutive brake pedal operations.

12. The automatic parking control device according to claim 10 wherein,
the drive system stop mode operates to turn the ignition OFF.

13. The automatic parking control device according to claim 12 wherein,
the drive system stop mode operates to turn the ignition OFF as well as to shift a shift mode to parking, and to set a parking brake ON.

14. The automatic parking control device according to claim 10 wherein,
the drive system comprises an engine.

15. The automatic parking control device according to claim 10 wherein, the drive system comprises a motor.

16. The automatic parking control device according to claim 1 wherein,
the drive system stop mode operates to turn the ignition OFF.

17. The automatic parking control device according to claim 16 wherein,
the drive system stop mode operates to turn the ignition OFF as well as to shift a shift mode to parking, and to set a parking brake ON.

18. An automatic parking control device comprising:
a camera;
a distance measuring sensor; and
a mode setting component for selecting an automatic parking mode;
a processor which calculates a parking guide path of a host vehicle from an image of the camera and an output signal of the sensor and performs a drive system stop mode as preliminarily set with respect to the vehicle depending on the selected automatic parking mode when it is found that the vehicle has been parked in a parking space along the guide path, wherein said selected automatic parking mode is a parking assist mode where the processor automatically performs one or more post-parking steps in response to an indication from a driver that parking is completed, the post-parking steps selected from the group consisting of: turning off a drive source, shifting a transmission to a park position, and setting a parking brake.

19. An automatic parking control device comprising:
a camera;
a distance measuring sensor; and
a mode setting component that allows a driver canto selectively set one of first and second automatic parking modes;
a processor which calculates a parking guide path of a host vehicle from an image of the camera and an output signal of the distance measuring sensor and, when it is detected that the host vehicle has been parked in a parking space along the guide path, performs a drive system stop mode (i) automatically upon said detection if the first automatic parking mode has been set and (ii) in response to a driver indication that parking is completed if the second automatic parking mode has been set, wherein the drive system stop mode comprises at least one of (a) turning off a vehicle drive source, (b) placing a vehicle transmission in a park position, and (c) setting a parking brake.

20. An automatic parking control device comprising:
a first sensor for detecting a surrounding object of a host vehicle;
a selecting unit for selecting a parking procedure from a plurality of parking procedures;
an automatic parking unit for automatically parking the host vehicle in a predetermined parking space based on at least the detection results of the first sensor; and
a processor for stopping a drive system of the host vehicle in a manner that corresponds to the parking procedure selected by the selecting unit, when the host vehicle is parked in the parking space.

21. The automatic parking control device according to claim 20, further comprising a second sensor for detecting a distance between the host vehicle and the surrounding object, and wherein said automatic parking unit automatically parks the host vehicle in said predetermined parking space based on the detection results of both the first sensor and the second sensor.

22. An automatic parking control method comprising the steps of:
detecting a surrounding object of a host vehicle;
selecting a parking procedure from a plurality of parking procedures;
automatically parking the host vehicle in a predetermined parking space based on a result of said detecting step; and
stopping a drive system of the host vehicle in a manner that corresponds to the selected parking procedure, when the host vehicle is parked in the parking space.

23. The automatic parking control method according to claim 22, further comprising the step of detecting a distance between the host vehicle and the surrounding object; and wherein said step of automatically parking comprises automatically parking the host vehicle in said predetermined parking space based on the detected surrounding and the detected distance.

* * * * *